(12) United States Patent
Krugly (10) Patent No.: US 6,501,193 B1
(45) Date of Patent: Dec. 31, 2002

(54) POWER CONVERTER HAVING REGULATED DUAL OUTPUTS

(75) Inventor: Simon Krugly, Camarillo, CA (US)

(73) Assignee: Power-One, Inc., Camarillo, CA (US)

( * ) Notice: Subject to any disclaimer, the term of this patent is extended or adjusted under 35 U.S.C. 154(b) by 0 days.

(21) Appl. No.: 09/948,456

(22) Filed: Sep. 7, 2001

(51) Int. Cl.$^7$ ................................................. H02J 1/00
(52) U.S. Cl. ....................................................... 307/31
(58) Field of Search ............................. 307/31, 32, 33, 307/34, 35; 363/21.04, 21.09

(56) References Cited

U.S. PATENT DOCUMENTS

| | | | |
|---|---|---|---|
| 4,302,803 A | * 11/1981 | Shelly | 363/20 |
| 4,660,136 A | * 4/1987 | Montorefano | 323/267 |
| 4,672,516 A | * 6/1987 | Ney et al. | 363/16 |
| 4,703,409 A | * 10/1987 | Spreen | 363/21.04 |
| 5,008,794 A | * 4/1991 | Leman | 363/21.16 |
| 5,363,323 A | * 11/1994 | Lange | 363/21.09 |
| 5,612,862 A | * 3/1997 | Marusik et al. | 323/266 |
| 5,715,153 A | 2/1998 | Lu | |
| 5,886,508 A | 3/1999 | Jutras | |
| 6,212,081 B1 | * 4/2001 | Sakai | 363/55 |

\* cited by examiner

*Primary Examiner*—Shawn Riley
(74) *Attorney, Agent, or Firm*—O'Melveny & Myers LLP (57) ABSTRACT

A power converter provides regulated dual outputs. The power converter includes a transformer having a primary winding, and first and second secondary windings. On a primary side of the converter, there is provided the primary winding of the transformer, and a first switch having an activation terminal, where the switch is coupled to the primary winding. A first controller has its input connected to the first output terminal of the converter and its output connected to the activation terminal of the switch. On a secondary side of the converter, there is provided first and second secondary sections. The first section includes the first secondary winding and a first inductor coupled between the first secondary winding and the first output terminal. The second section includes the second secondary winding and a second inductor coupled between the second secondary winding and the second output terminal. The first and second inductors may be magnetically coupled or independent. The second secondary section also includes a second switch adapted to apply a regulating voltage to the second inductor during a regulating period of the converter. The regulating voltage increases the volt-seconds applied to the second inductor to regulate the voltage at the second output terminal.

20 Claims, 7 Drawing Sheets

POWER CONVERTER HAVING REGULATED DUAL OUTPUTS

BACKGROUND OF THE INVENTION

1. Field of the Invention

The present invention relates to electric power converters. More specifically, the present invention relates to power converters having regulated dual outputs.

2. Description of Related Art

There is constant need in the electronics industry for efficient DC-to-DC or AC-to-DC power converters. The current trend is to develop low output voltage (e.g., 3.3 V and less), high output current (e.g., greater than 20 A), high efficiency, and high power density converters.

It is well known to form a converter circuit having a dual output. In one such known dual output converter circuit, both outputs of the converter are regulated. A regulating switch is arranged in series with a forward diode so that the switch is conducting during most of the "on-time" of the converter. A drawback of this arrangement is that the conduction of the switch during most of the on-time increases the power dissipation in the circuit, and thus reduces the efficiency of the converter circuit. Further, during transient conditions when the duty cycle temporarily goes to zero, the second output may sag so as to exhibit poor cross regulation.

In a second conventional dual output converter circuit, a first output is regulated and a second output is quasi-regulated. The second conventional converter has inductors coupled to a common core so that the size of the converter circuit is reduced compared to the first conventional converter discussed above. This converter provides good power density and efficiency, but suffers from poor regulation, particularly at low voltages and high currents of the quasi-regulated output. Additionally, the initial voltage of the quasi-regulated output is determined by the voltage at the first output and the turns ratio of the secondary windings of the transformer. This puts severe limitations on the achievable voltages at the second output, again, particularly at low voltages and high currents. Thus, the second conventional converter is limited to applications that require only relatively low output currents.

Accordingly, it would be very desirable to provide a converter having well-regulated dual outputs with improved power density, improved efficiency and cross regulation, along with fewer limitations on the achievable output voltages.

SUMMARY OF THE INVENTION

The present invention provides a converter having well-regulated dual outputs. The converter according to the present invention also has the advantages of improved power density, efficiency, and cross regulation, while providing fewer limitations on the achievable output voltages.

In a first embodiment, a converter having first and second output terminals includes a transformer having a primary winding, and first and second secondary windings. On a primary side of the converter, there is provided the primary winding of the transformer, and a first switch having an activation terminal, where the switch is coupled to the primary winding. A first controller has its input connected to the first output terminal of the converter and its output connected to the activation terminal of the switch. On a secondary side of the converter, there is provided first and second secondary sections. The first section includes the first secondary winding and a first inductor coupled between the first secondary winding and the first output terminal. The second section includes the second secondary winding and a second inductor coupled between the second secondary winding and the second output terminal. The first and second inductors can be either independent or magnetically coupled. The first and second sections on the secondary side of the converter each further include a forward rectifier (e.g., diode or MOSFET) connected in series between the respective secondary winding and inductor, and a freewheeling rectifier (e.g., diode or MOSFET) connected in parallel with the respective secondary winding. The second secondary section also includes a second switch adapted to apply a regulating voltage to the second inductor during a regulating period of the converter. The regulating voltage increases the volt-seconds applied to the second inductor, which improves the regulation of the voltage at the second output terminal.

If the two output voltages are close, the conduction in the second switch is short in comparison with the period of the switching frequency of the converter circuit and therefore the power dissipation in the second switch is low. When the second switch is conducting, which occurs in a regulation period of the converter, the freewheeling rectifier of the second section is not conducting, thereby further reducing power dissipation. As regulating (auxiliary) voltage is applied to the second inductor during a portion of the off-time, lower on-time voltage amplitude is required to achieve desired secondary voltage. That reduces voltage stress on the rectifiers and therefore allows a further reduction of power dissipation by using low on-resistance devices such as MOSFETs or Schottky diodes. By controlling the regulation period, the voltage at the second output terminal is well regulated. As energy to the second output is supplied partially from the auxiliary voltage source, it further improves the dynamic cross-regulation between the two outputs.

In a second embodiment, a converter having first and second output terminals includes a transformer having a primary winding and a secondary winding. On a primary side of the converter there is provided the primary winding of the transformer, and a first switch having an activation terminal, where the switch is coupled to the primary winding. Also included is a first controller having its input connected to the first output terminal of the converter and its output connected to the activation terminal of the first switch. On a secondary side of the converter, there is provided the secondary winding. First and second coupled or independent inductors are connected through rectifiers to the secondary winding and the first and second output terminals, respectively. The second secondary section also includes a second switch adapted to apply a regulating voltage to the second inductor during a regulating period of the converter. The regulating voltage increases the volt-seconds applied to the second inductor, which improves the regulation of the voltage at the second output terminal.

If the turns ratio of the secondary windings of the transformer is equal to one, then a transformer having a single secondary winding may be used. Advantages of having one secondary winding include simpler transformer construction and improved cross-regulation of the output voltages at the first and second output terminals. Also, because there is only one secondary winding, the first controller provides load regulation for both output voltages. Accordingly, a second controller regulates the output voltage at the second output terminal only to the required output voltage level, which leads to a shorter regulating interval $T_{reg}$, and consequently even less power dissipation as compared to the first embodiment. As in the first embodiment, the second switch conducts only during a portion of the off-time period of the converter referred to as the regulation period. This causes a regulating voltage to be applied to the second inductor and increases the volt-seconds applied to the second inductor so that the voltage at the second output terminal is well-regulated.

A more complete understanding of the present invention will be afforded to those skilled in the art, as well as a realization of additional advantages and objects thereof, by a consideration of the following detailed description of preferred embodiments. Reference will be made to the appended sheets of drawings, which will first be described briefly.

DETAILED DESCRIPTION OF PREFERRED EMBODIMENTS

The present invention provides a DC-to-DC power converter having well-regulated dual outputs, high power density and efficiency, and which exhibits good cross-regulation. In the detailed description that follows, like element numerals are used to describe like elements illustrated in one or more of the aforementioned figures.

Figure 1:
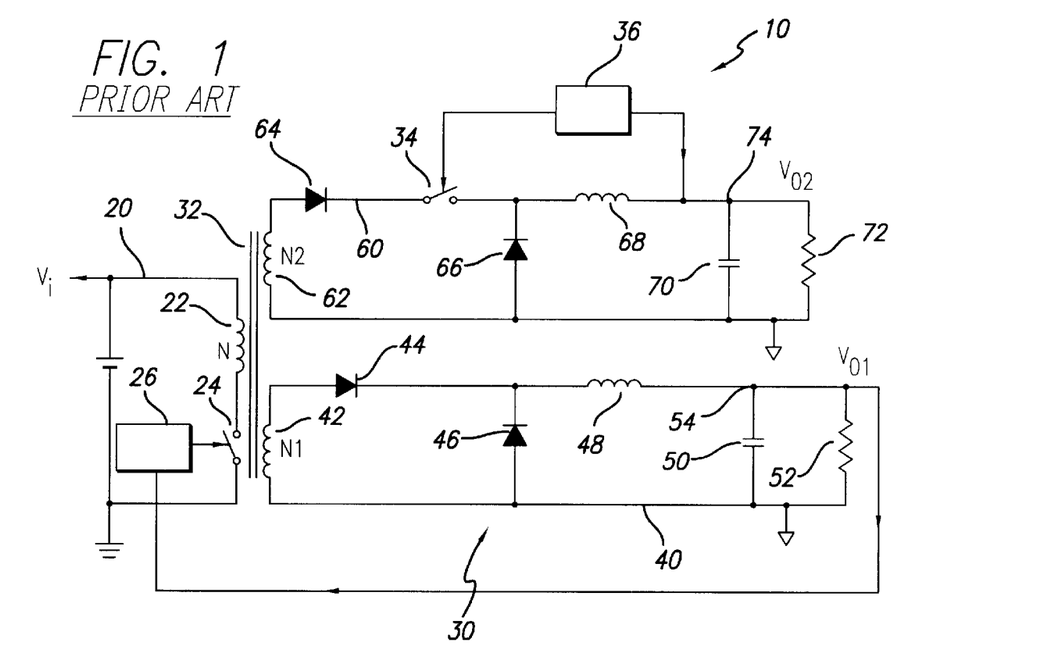
FIG. 1 is a schematic diagram of a conventional converter having regulated dual outputs.

FIG. 1 is a schematic diagram of a conventional converter 10 that has regulated output voltages $V_{O1}$, $V_{O2}$ at output terminals 54, 74, respectively. The converter 10 includes a primary side 20 and a secondary side 30. On the primary side 20, there is provided a power source providing input voltage $V_i$, a primary winding 22 of a transformer 32, a switch 24, and a feedback control circuit 26. The input voltage $V_i$ is coupled to a first end of the primary winding 22. A second end of the primary winding 22 is connected to the switch 24, which in turn is connected to ground. The control circuit 26 is connected to an activation terminal of switch 24 to control the turn on and turn off times of the switch 24. The feedback control circuit 26 is also connected to the output terminal 54.

On the secondary side 30, there is provided two secondary sections 40 and 60. The sections 40 and 60 include secondary windings 42, 62 of the transformer 32, forward rectifiers 44, 64, freewheeling rectifiers 46, 66, inductors 48, 68, capacitors 50, 70, and load resistors 52, 72, respectively. As shown in FIG. 1, the forward rectifiers 44, 64 and freewheeling rectifiers 46, 66 are provided by diodes. Further, the secondary side 30 includes a switch 34 and a control circuit 36. In the first secondary section 40 of the secondary side 30, an anode of the forward rectifier 44 is connected to a first end of the secondary winding 42. A cathode of the forward rectifier 44 is connected to a cathode of the freewheeling rectifier 46 and a first end of the inductor 48. A second end of the inductor 48 is connected to the output terminal 54. The capacitor 50 and load resistor 52 also have their first ends connected to the output terminal 54, and their second ends connected to ground. An anode of the freewheeling rectifier 46 is also connected to ground.

Similarly, in a second secondary section 60 of the secondary side 30, an anode of the forward rectifier 64 is connected to a first end of the secondary winding 62. A cathode of the forward rectifier 64 is connected to a first end of switch 34. A second end of switch 34 is connected to a cathode of the freewheeling rectifier 66 and a first end of the inductor 68. A second end of the inductor 68 is connected to an output terminal 74. The capacitor 70 and load resistor 72 also have first ends connected to the output terminal 74, and second ends connected to ground. An anode of the freewheeling rectifier 66 is also connected to ground. The second section 60 also includes a control circuit 36 that has an output terminal connected to an activation terminal of the switch 34 and an input terminal connected to the output terminal 74.

In the converter 10, the second output voltage $V_{O2}$ is regulated by the switch 34 and control circuit 36. Because the switch 34 is connected in series with the forward rectifier 64, the regulation of the second output voltage $V_{O2}$ occurs during the on-time of the converter 10, which corresponds to an on-state of the switch 24. In other words, the switch 34 further regulates the on-time of the second secondary section 60 in order to regulate the output voltage $V_{O2}$. For example, if the switch 34 is conducting for all of the on-time of the converter 10 and the voltage $V_{O2}$ that is output is 5 volts, then by adjusting the on-time of the switch 34 with the control circuit 36, the voltage $V_{O2}$ can be decreased. More specifically, if switch 34 is turned on for 80% of the on-time of the converter 10, then the. output voltage $V_{O2}$ is reduced to 4 volts. Thus, in the configuration of FIG. 1, the switch 34 and the control circuit 36 act as a leading-edge or a trailing-edge post-regulator.

A disadvantage of the conventional converter 10 is that the regulation of the output voltage $V_{O2}$ requires conduction of the regulating switch 34 during most of the on-time of the converter 10. By regulating with switch 34 being in series with forward rectifier 64 and conducting during most of the on-time period, there is increased power dissipation in the circuit since conduction through the switch 34 increases the losses in the system. Further, the conventional converter 10 can only step down the output voltage $V_{O2}$ from its unregulated voltage level, so higher amplitude of the on-time voltage from the winding 62 is required. Therefore, rectifiers 60, 66 and switch 34 should be designed to withstand higher voltage stress, which further increases their power losses. Moreover, if control circuit 26 reduces on-time significantly under load transient conditions, the output voltage $V_{O2}$ may sag downward. Accordingly, the conventional converter 10 suffers from high loss and low efficiency, as well as poor cross-regulation during transient conditions.

Figure 2:
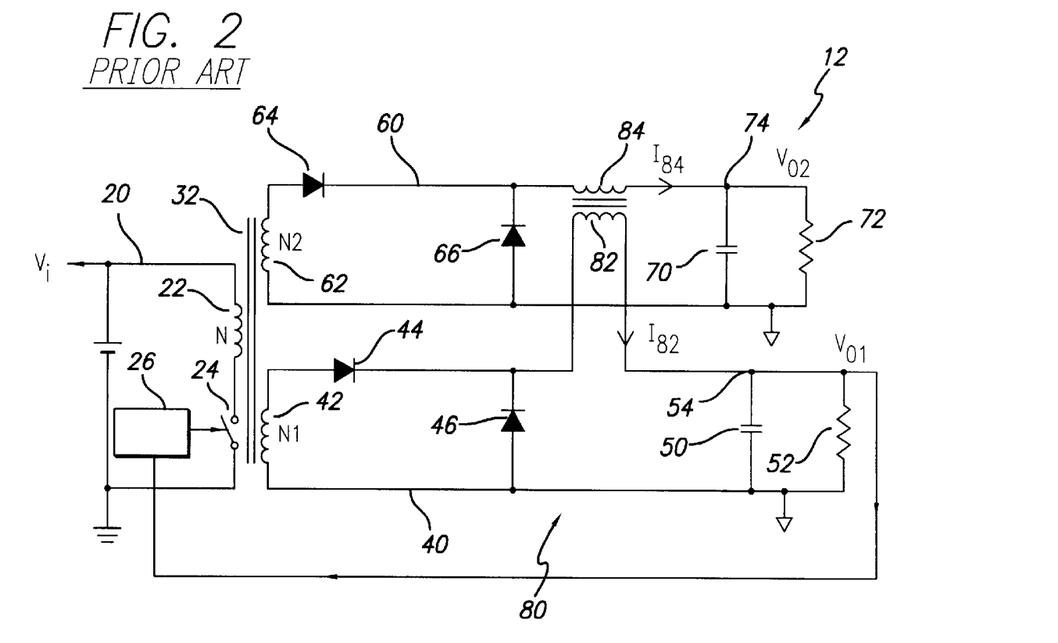
FIG. 2 is a schematic diagram of a conventional converter having a regulated output and a quasi-regulated output.

FIG. 2 is schematic diagram of a second conventional converter 12 having a regulated output voltage $V_{o1}$ at output terminal 54 and a quasi-regulated output voltage $V_{o2}$ at output terminal 74. The converter 12 includes a primary side 20 and a secondary side 80. Note that the primary side 20 of FIG. 2 has the same configuration as the primary side 20 of FIG. 1. On the secondary side 80, there is provided essentially the same configuration as the secondary side 30 of FIG. 1, except that inductors 82 and 84 share a common core. Additionally, the switch 34 and the control circuit 36 are eliminated so that the cathode of the forward rectifier 64 is connected to the cathode of the freewheeling rectifier 66 and a first end of the inductor 84.

Figure 3:
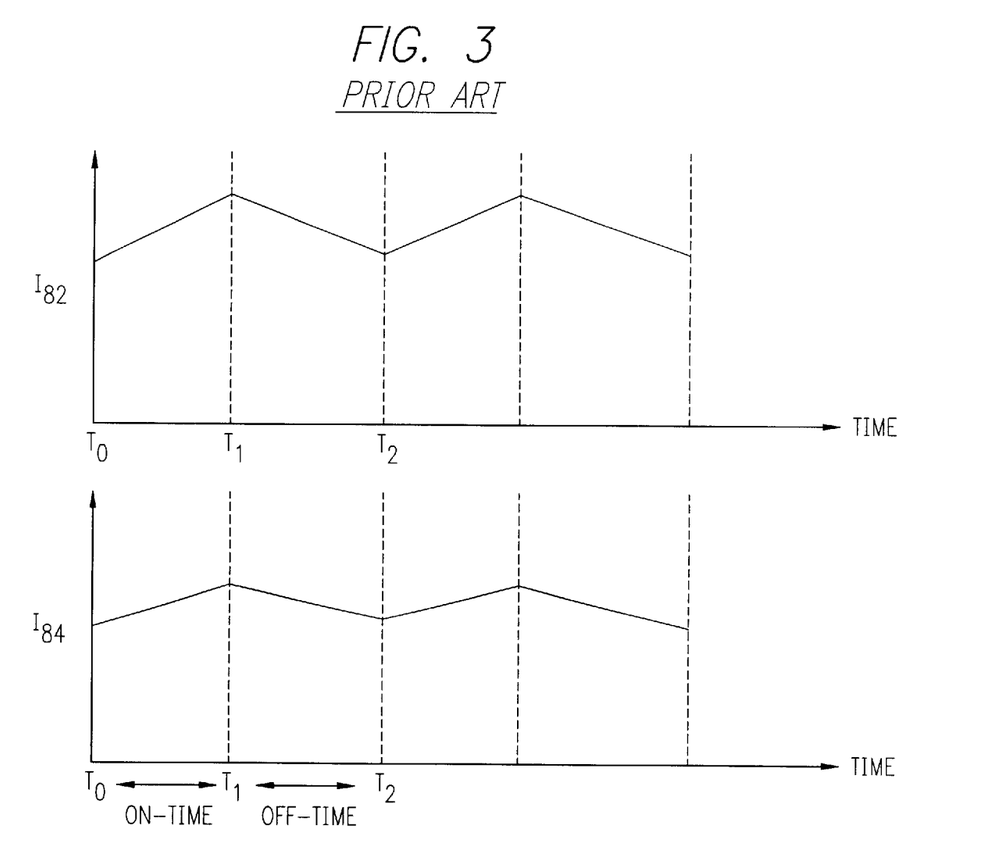
FIGS. 3(a)–(b) are graphs showing current waveforms in the coupled inductors of FIG. 2.

In operation, the initial voltage of the quasi-regulated output voltage $V_{o2}$ is determined by the regulated voltage at the first output terminal 54 and the turns ratio N2/N1 of the secondary windings 64, 44 of the transformer 32. The same turns ratio would ordinarily be utilized for the coupled inductor windings 82, 84 to avoid high circulating currents. This puts severe limitations on the achievable voltages at the second output terminal 74, particularly at low voltages and high currents where a high number of turns is necessary to maintain the output voltage $V_{o2}$, which further leads to high copper losses at high currents. In addition, because of finite leakage inductance of the inductors 62, 42, at different currents on the outputs $V_{o1}$, $V_{o2}$, the effective duty cycles on the sections 40, 60 are different, particularly at low voltages and high currents. As a result, the converter 12 exhibits poor load regulation at the second output terminal 74. FIGS. 3(a)–3(b) are graphs showing the current waveforms of currents $I_{82}$, $I_{84}$ flowing in the respective coupled inductors 82, 84.

Figure 4:
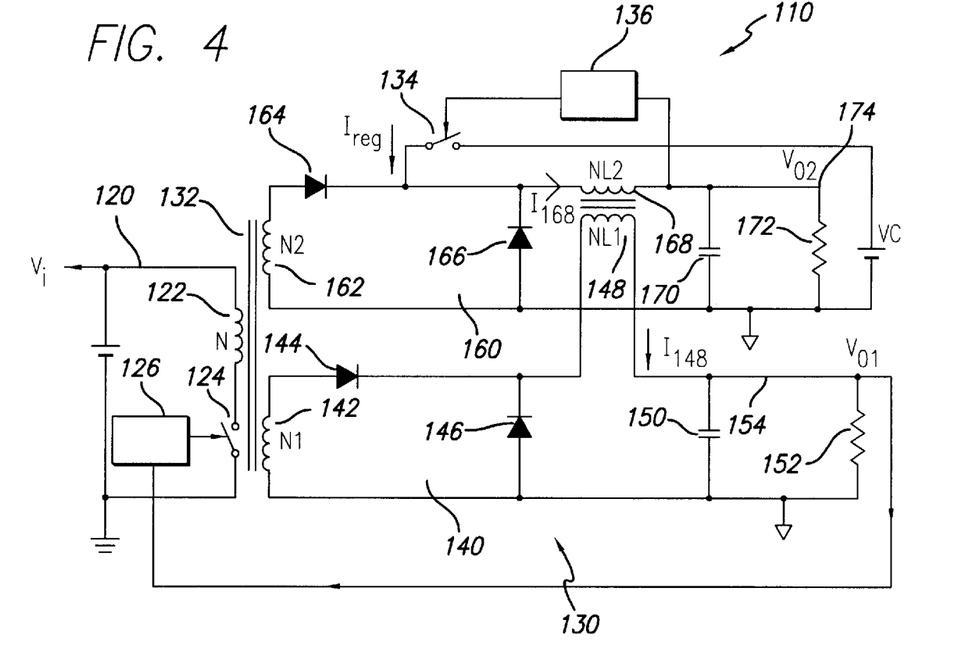
FIG. 4 is a schematic diagram of a converter according an embodiment of the present invention.

In contrast, the present invention provides a converter having well-regulated dual outputs, improved power density, improved efficiency and cross regulation along with less limitations on the achievable output voltages. FIG. 4 is a schematic diagram of a power converter according to an embodiment of the present invention. The converter includes a primary side 120 and a secondary side 130. On the primary side 120, there is a power source providing an input voltage $V_i$, a primary winding 122 of a transformer 132, a switch 124, and a feedback control circuit 126. On the secondary side 130, there is provided two secondary sections 140, 160. The secondary sections 140, 160 include secondary windings 142, 162 of the transformer 132, forward rectifiers 144, 164, freewheeling rectifiers 146, 166, inductors 148, 168, capacitors 150, 170, and load resistors 152, 172, respectively. Further, the secondary side 130 includes a switch 134 and a control circuit 136.

On the primary side 120, the input voltage $V_i$ is coupled to a first end of the primary winding 122. A second end of the primary winding 122 is connected to the switch 124, which in turn is connected to ground. The control circuit 126 is connected to the activation terminal of the switch 124 to control the turn on and turn off times of the switch 124. The control circuit 126 is also connected to the output terminal 154.

In the first section 140 of the secondary side 130, an anode of the forward rectifier 144 is connected to a first end of the secondary winding 142. A cathode of the forward rectifier 144 is connected to a cathode of the freewheeling rectifier 146 and a first end of the inductor 148. A second end of the inductor 148 is connected to an output terminal 154. The capacitor 150 and load resistor 152 also have their first ends connected to the output terminal 154, and their second ends connected to ground. An anode of the freewheeling rectifier 146 is also connected to ground.

Similarly, in the second section 160 of the secondary side 130, an anode of the forward rectifier 164 is connected to a first end of the secondary winding 162. A cathode of the forward rectifier 164 is connected to a cathode of the freewheeling rectifier 166 and a first end of the inductor 168. A second end of the inductor 168 is connected to an output terminal 174. The capacitor 170 and load resistor 172 also have their first ends connected to the output terminal 174, and their second ends connected to ground. An anode of the freewheeling rectifier 166 is also connected to ground. The second section 160 also includes the switch 134 with its first end connected to the cathode of the forward rectifier 164 and its second end connected to an auxiliary voltage source $V_c$. An output of the control circuit 136 is connected to an activation terminal of the switch 134 and its input connected to the output terminal 174.

As shown in FIG. 4, the inductor 148 is magnetically coupled to the inductor 168 so as to share the same core. Note that with the use of coupled inductors in the present invention, the turns ratio NL2/NL1 of the coupled inductors 168,148 is equal to the turns ratio N2/N1 of the secondary windings 162, 142 of the transformer 132. Further, the construction of the coupled inductors should provide high enough leakage inductance between the inductors 148, 168. It should also be appreciated that the inductors 148, 168 can also be independent from each other without magnetic coupling.

Figure 5:
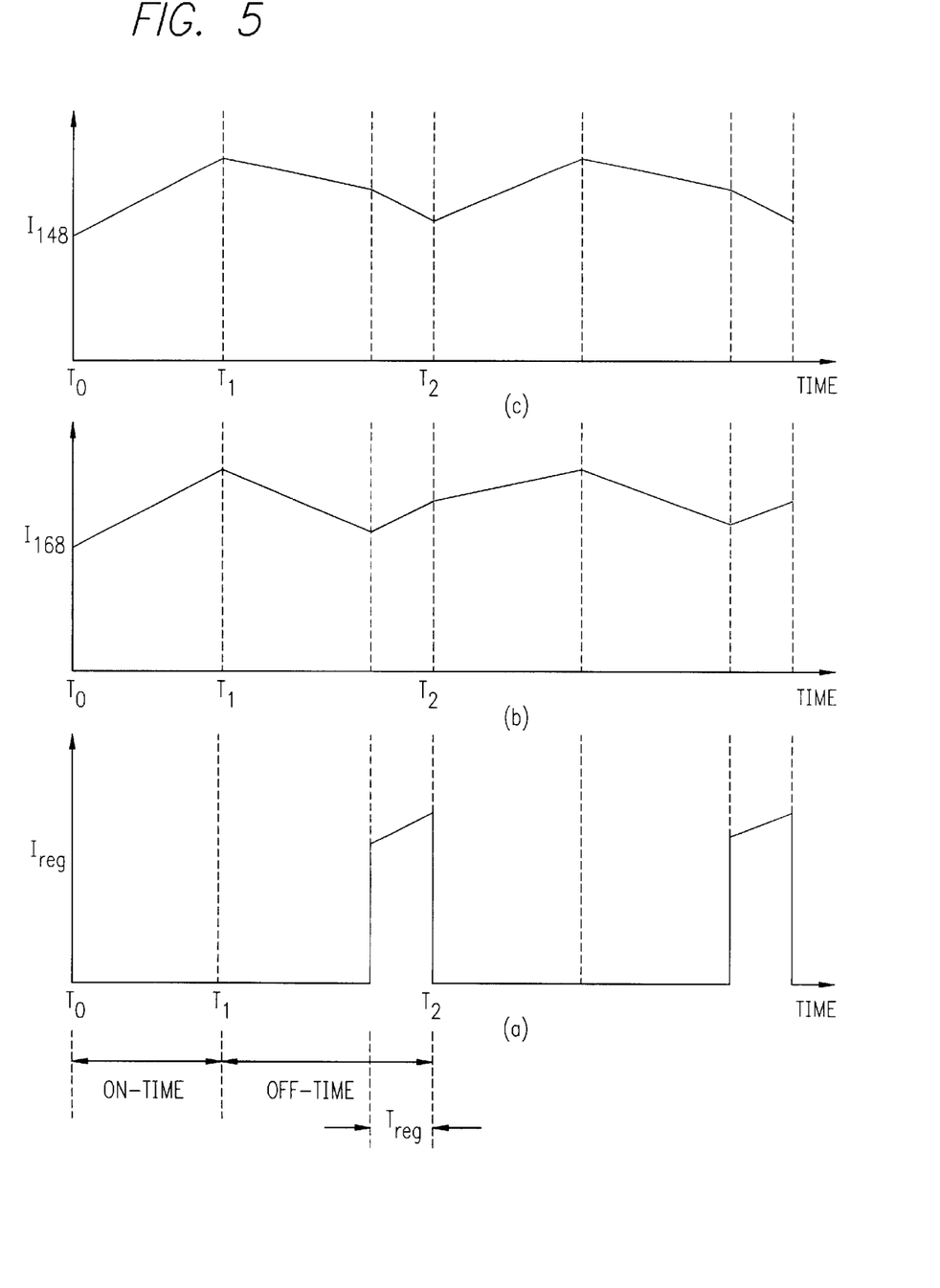
FIGS. 5(a)–(c) are graphs showing current waveforms of currents conducting in a regulating switch and coupled inductors in the converter of FIG. 4.

FIGS. 5(a)–(b) are graphs showing the current waveforms $I_{148}$, $I_{168}$ in the coupled inductors 148, 168, respectively, and FIG. 5(c) is a graph showing the current waveform $I_{reg}$ in the regulating switch 134. During an on-time of the converter 110, which corresponds to an on-state of the switch 124, the input voltage $V_i$ is applied to the primary winding 122 of the transformer 132. The voltages that are induced on the secondary windings 142, 162 forward bias the forward rectifiers 144, 164 so that they become conducting. The voltages on the secondary windings 142, 162 are then applied to the coupled inductors 148, 168 at the start of the on-time period. During the on-time period, the current $I_{148}$, $I_{168}$ of the coupled inductors 148,168 is increasing as well as the magnetizing current of the coupled inductor. Further, the current $I_{148}$, $I_{168}$ of the windings 148, 168 flow into respective capacitors 150, 170, and into load resistors 152, 172, respectively. Note that during the on-time period, the switch 134 is not conducting and the operation of the converter 110 is otherwise the same as the conventional converter 12 of FIG. 2.

During an off-time of the converter 110, which corresponds to an off-state of the switch 124, the polarity on the secondary windings 142, 162 becomes reversed. Forward rectifiers 144, 164 turn off and freewheeling rectifiers 146, 166 begin to conduct. In a first portion of the off-time period, the operation of the converter 110 is the same as the converter 12 of FIG. 2; however, in a second portion of the off-time period, referred to as the regulation period $T_{reg}$, the converter 110 operates differently from the conventional converter 12. Specifically, in the regulation period $T_{reg}$, the control circuit 136 turns on the switch 134 so that it becomes conducting. By turning on switch 134, the auxiliary voltage Vc is applied to the inductor 168. As shown in FIGS. 5(b) and 5(c), this results in an increase of the current $I_{168}$ that is flowing through the inductor 168, and a decrease of the current $I_{148}$ that is flowing through the inductor 148. In case of independent inductors 148, 168, current $I_{148}$ will keep decreasing at the same rate as during the off-time interval. This behavior is different from the operation of the conventional converter 12. Referring back to FIG. 3, the current $I_{168}$ in the coupled inductor 168 does not increase during any portion of the off-time period but only decreases.

The rate of change in the current $I_{148}$, $I_{168}$ in the inductors 148, 168 is governed primarily by the leakage inductances associated with the windings 148,168 and the voltages $V_c$, $V_{01}$, $V_{02}$ that are applied to the respective windings of the inductors 148, 168. For example, as shown in FIGS. 5(b) and 5(c), during the portion of the off-time period when voltage $V_{02}$ is not regulated, the rate of change in current $I_{168}$ is greater than the rate of change in current $I_{148}$. This occurs because the voltage level of $V_{02}$ is higher than the voltage level of voltage $V_{01}$ during this time. Further, during the regulation period $T_{reg}$, voltage $V_c$, which is at a higher voltage level than the voltage level of $V_{02}$, is applied to the first end of inductor 168 so that the current $I_{168}$ increases. By applying voltage $V_c$ to inductor 168, an asymmetrical condition arises. This results in the current $I_{168}$ increasing, and the current $I_{148}$ decreasing at a greater rate during $T_{reg}$. Note that the magnetizing current of the coupled inductors 148, 168 changes also, but only to an insignificant extent so that the increase in the current $I_{168}$ occurs primarily due to the redistribution of the magnetizing current from the windings of the inductor 148 to the windings of the inductor 168.

Further, to limit the ripple in the currents $I_{148}$, $I_{168}$, there is preferably provided sufficient leakage inductances between the windings of the inductors 148, 168. For example, if the leakage inductances are too low, then the ripple in the currents $I_{148}$, $I_{168}$ would be too high so that other parameters of the converter 110 may suffer. Thus, it is important to provide sufficient leakage inductances between the windings of the inductors 148,168.

The regulation interval $T_{reg}$ ends at the beginning of the on-time period of the next duty cycle and the switch 134 is turned off. The voltages applied to the windings of the coupled inductors 148, 168 are essentially balanced during the on-time period, as well as during the portion of the off-time period when the second output voltage $V_{02}$ is not regulated. So, the magnetizing current redistributes between the windings of the coupled inductors 148, 168 according to the respective last values of the currents $I_{148}$, $I_{168}$. Note that the new value s of the leakage inductance current rates $I_{148}$, $I_{168}$ are supported by new values of the output voltages $V_{01}$, $V_{02}$, respectively, (e.g., higher $V_{02}$ and lower $V_{01}$), and changes to the duration of the regulating interval $T_{reg}$ allows for regulation of $V_{02}$ while $V_{01}$ is regulated by the feedback control circuit 126. In other words, the application of auxiliary voltage $V_c$ for some period of time $T_{reg}$ changes the balance of volt-seconds applied to the three-inductor system comprising two leakage inducances of windings 148, 168 and magnetizing inductance of the coupled inductor. The new balance of volt-seconds is then found with a different value of $V_{02}$. Therefore, duration of $T_{reg}$ is decreased for higher values of the auxiliary voltage $V_c$ so that the voltage level of $V_c$ determines the power dissipation in the switch 134. Further, the pulse of current $I_{reg}$ is short in comparison to the period of the switching frequency so that the energy dissipated in switch 134 is low. Also, when the switch 134 is conducting, the freewheeling rectifier 166 is not conducting so that the dissipation in the switch 134 is mostly compensated.

Figure 6:
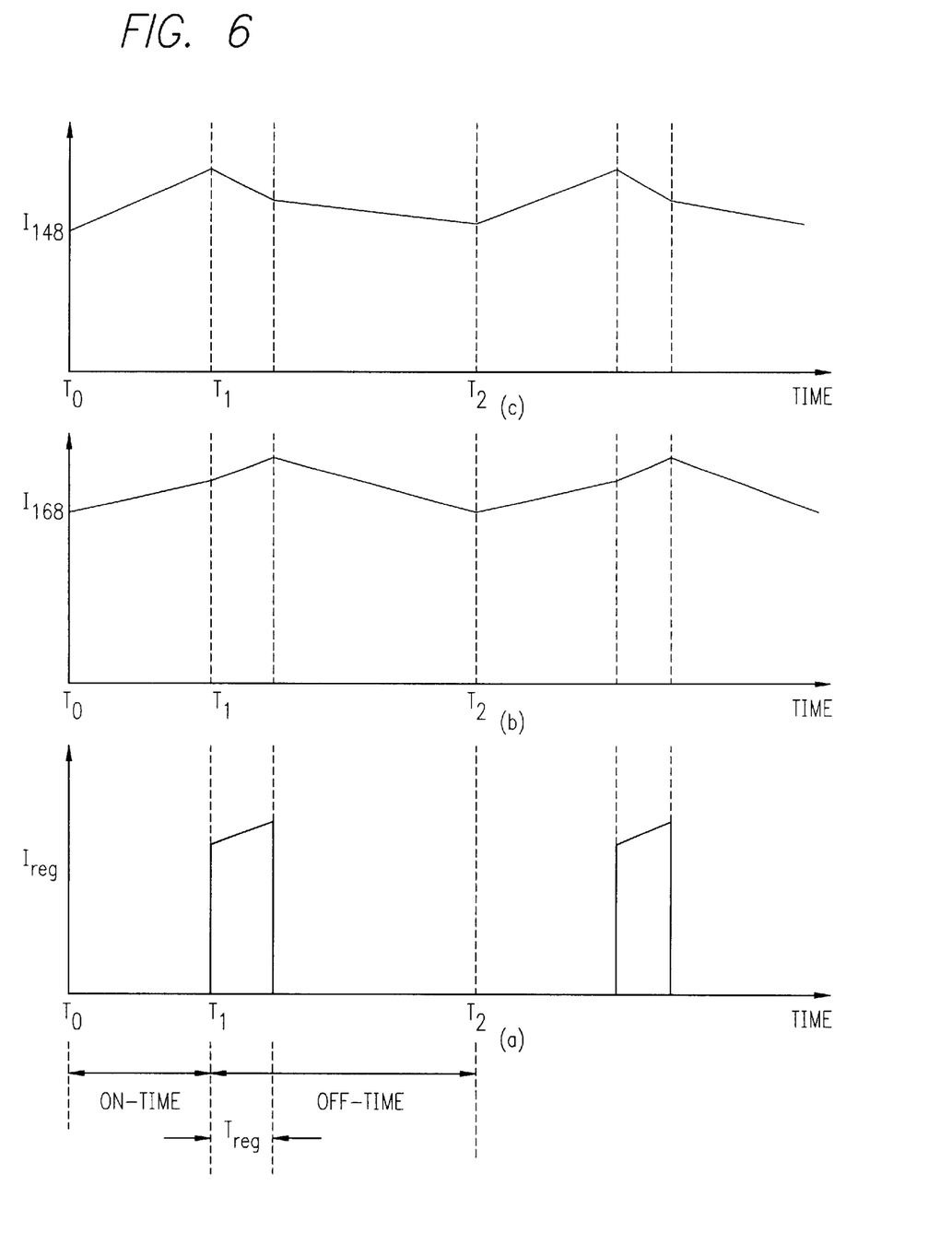
FIGS. 6(a)–(c) are graphs showing current waveforms of currents conducting in a regulating switch and coupled inductors where a regulation period occurs at a beginning of an off-time period of the converter of FIG. 4.

FIGS. 6(a)-(c) are graphs showing the current waveforms in the regulating switch and the coupled inductors when the regulation period $T_{reg}$ occurs at the beginning of the off-time period. As illustrated in FIG. 6(a), the regulation period $T_{reg}$ can be varied so that it occurs within any portion of the off-time interval T1 to T2.

Figure 7:
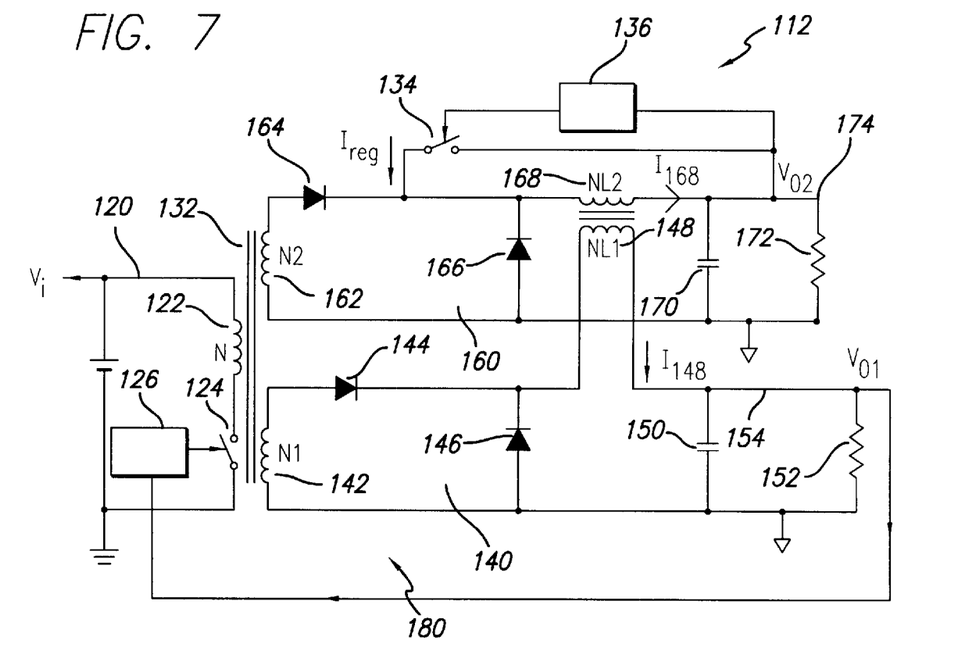
FIG. 7 is a schematic diagram of a modification of the converter of FIG. 4 where a regulation voltage is provided by the second output terminal.

FIG. 7 is a modification of the converter of FIG. 4 that uses the second output voltage $V_{02}$ as the regulating voltage source. Referring to FIG. 7, the second end of switch 134 is connected to the second output terminal 174. In this configuration, during regulation interval $T_{reg}$, the inductor 168 is shorted. By shorting out the inductor 168, the current flowing in the capacitor 170 is redistributed to the switch 134. The operation of the converter 112 is essentially the same as the converter 110, except that there is lower rate of change in the current $I_{168}$, and a longer regulation period $T_{reg}$ since output voltage $V_{02}$ is normally at a lower voltage level than a voltage source providing voltage $V_c$. An advantage of the converter 112 is that less space and components are required as compared to the converter 110.

Figure 8:
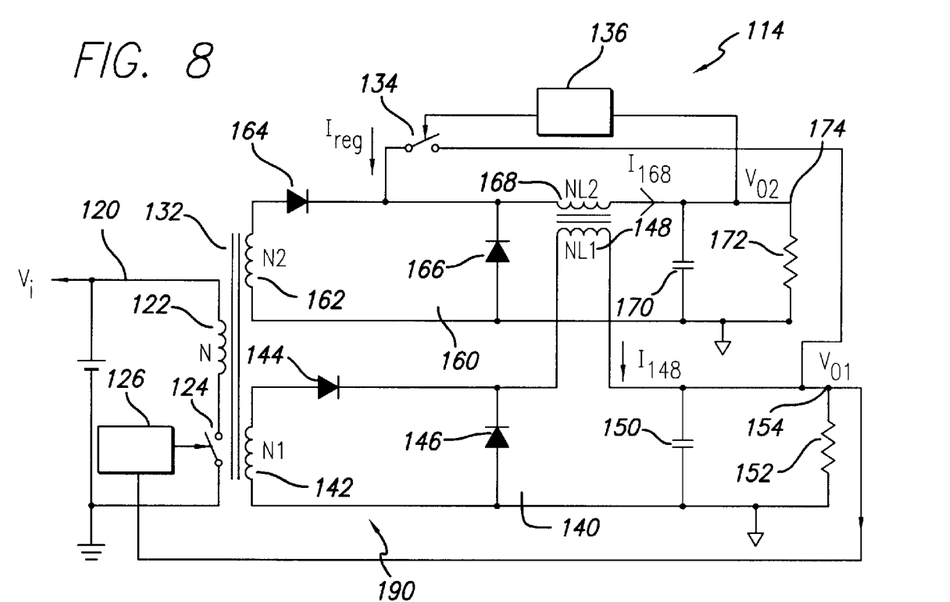
FIG. 8 is a schematic diagram of a modification of the converter of FIG. 4 where a regulation voltage is provided by the first output terminal.

FIG. 8 is another modification of the converter of FIG. 4 that uses the first output voltage $V_{01}$ as the regulating voltage. Referring to FIG. 8, the second end of switch 134 is connected to the first output terminal 154. In this configuration, during regulation interval $T_{reg}$, the current flowing in the capacitor 150 is redistributed to the switch 134. Note that the operation of the converter 114 is essentially the same as the converter 110, except that there is lower rate of change in the current $I_{148}$, and a longer regulation period $T_{reg}$ since output voltage $V_{01}$ is normally at a lower voltage level than a voltage source providing voltage $V_c$. Similar to the implementation of FIG. 7, the converter 114 requires less space and components as compared to the converter 110. Accordingly, in the present invention, a separate voltage source providing voltage $V_c$ or any of the output voltages $V_{01}$ or $V_{02}$ can be used as the regulating voltage.

Figure 9:
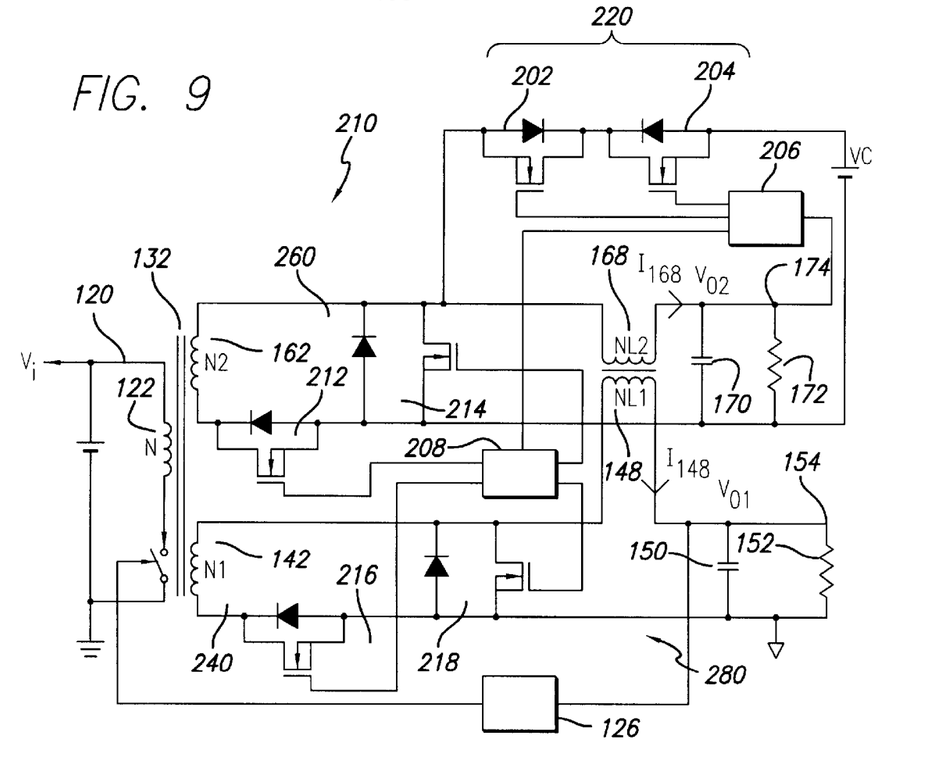
FIG. 9 is a schematic diagram of a converter according to another embodiment of the present invention.

FIG. 9 is a schematic diagram of a converter according to another embodiment of the present invention. In FIG. 9, the rectifiers 212, 214, 216, and 218 are implemented as synchronous rectifiers such as MOSFETs having respective body diodes. Additionally, a switch 220 is configured in a series connection of two N-channel MOSFETs 202, 204 having commonly coupled drain terminals. The series connection of the MOSFETs 202, 204 prevents parasitic conduction through their respective body diodes. Also provided is an additional control circuit 208 for controlling the turn-on and turn-off times of the synchronous rectifiers 212, 214, 216, and 218. Further, the forward rectifiers 216, 212 are arranged so as to be in the return path of respective sections 240, 260. The operation of the converter 210 with synchronous rectifiers 212, 214, 216, and 218 is the same as described above for the converter 110 of FIG. 4, except that the control circuit 208 turns off the rectifier 214 prior to turning on of the switch 220 by the control circuit 206.

Figure 10:
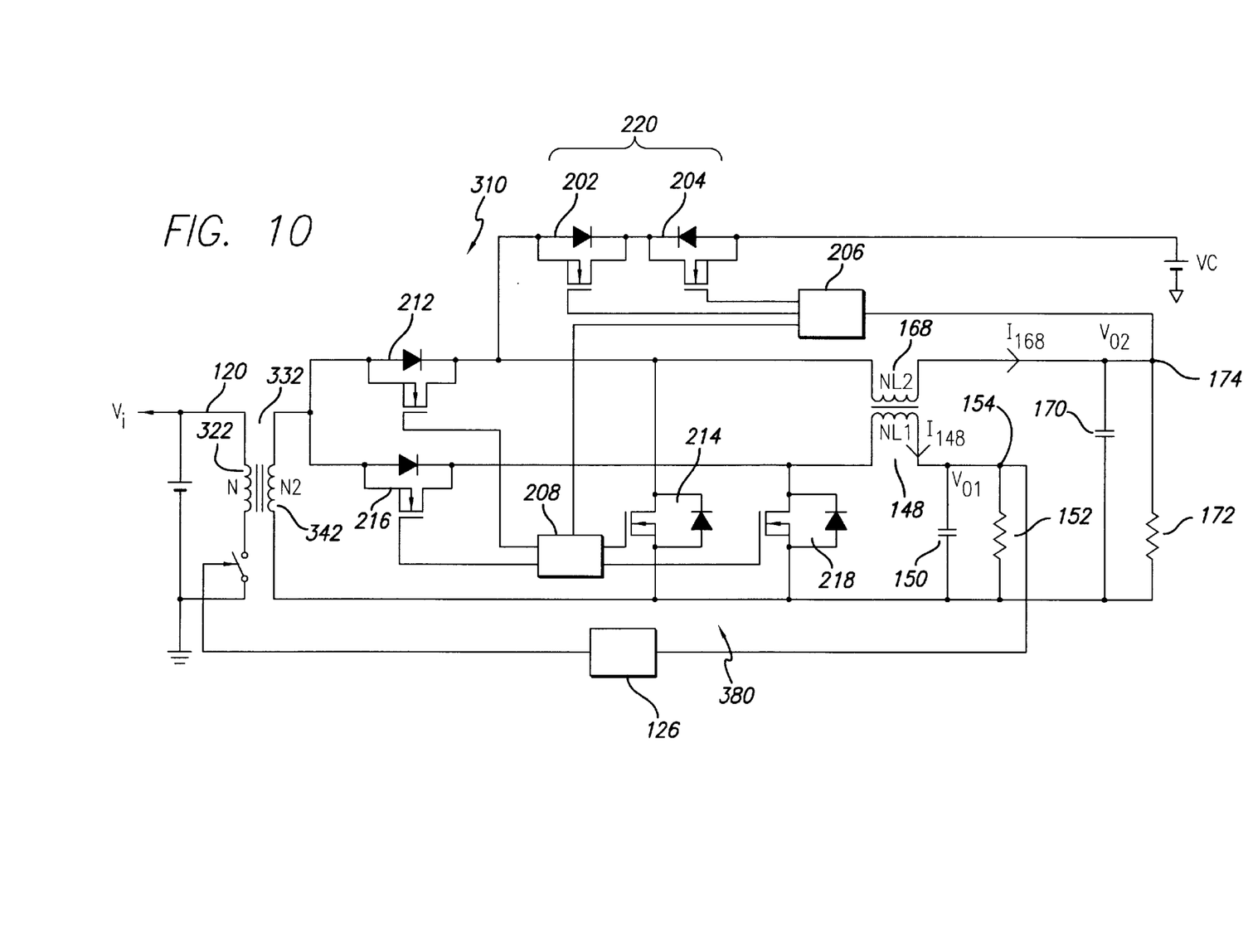
FIG. 10 is a schematic diagram of a modification of the converter of FIG. 9 where a transformer has a single secondary winding.

FIG. 10 is a schematic diagram of a modification of the converter of FIG. 9 where a transformer has a single secondary winding. If the turns ratio N2/N1 of the secondary windings of the transformer 132 of FIG. 9 is equal to one, then a transformer 332 having one secondary winding 342 may be used as shown in FIG. 10. Referring to FIG. 10, the synchronous rectifiers 212 and 216 are provided between the secondary winding 332 and the inductors 168, 148, respectively, whereas in FIG. 9, the rectifiers 212, 216 are provided at the return path of the respective secondary sections of converter 210. Advantages of having one secondary winding 342 include simpler transformer construction and improved cross-regulation of the two output voltages $V_{01}$, $V_{02}$. Also, because there is only one secondary winding 342, the feedback control circuit 126 controls load regulation for both output voltages $V_{01}$ and $V_{02}$. Accordingly, the control circuit 206 regulates the output voltage $V_{02}$ only to the required output voltage level, which leads to a shorter regulating interval $T_{reg}$, and consequently lower power dissipation.

Having thus described preferred embodiments of the present invention, it should be apparent to those skilled in the art that certain advantages have been achieved. It should also be appreciated that various modifications, adaptations, and alternative embodiments may be made within the scope and spirit of the present invention. The invention is further defined by the following claims.

What is claimed is:

1. A converter having first and second outputs, comprising:
   a transformer having a primary winding and at least one secondary winding;
   a primary side including said primary winding of said transformer, a first switch coupled between said primary winding and ground, said first switch adapted to alternatingly apply an input voltage to said primary winding to define successive on-states and off-states of said converter responsive to feedback voltage from said first output;
   a secondary side having first and second sections, said first section including said at least one secondary winding and a first inductor coupled between said at least one secondary winding and said first output, said second section including said at least one secondary winding and a second inductor coupled between said at least one secondary winding and said second output; and
   a second switch adapted to apply a regulating voltage between said second inductor and said at least one secondary winding during a regulating period corresponding to a portion of said off-states to thereby increase volt-seconds applied to said second inductor.

2. The converter of claim 1, wherein said first and second inductors are inductively coupled together.

3. The converter of claim 1, wherein said first and second inductors are independent from each other.

4. The converter of claim 1, further comprising an auxiliary voltage source providing said regulating voltage.

5. The converter of claim 1, wherein said first output provides said regulating voltage.

6. The converter of claim 1, wherein said second output provides said regulating voltage.

7. The converter of claim 1, wherein said first section further comprises a first forward rectifier connected in series between said at least one secondary winding and said first inductor, and a first freewheeling rectifier connected in parallel with said at least one secondary winding.

8. The converter of claim 7, wherein said second section further comprises a second forward rectifier connected in series between said at least one secondary winding and said second inductor, and a second freewheeling rectifier connected in parallel with said at least one secondary winding.

9. The converter of claim 8, wherein said first and second forward rectifiers and said first and second freewheeling rectifiers further comprise MOSFETs.

10. The converter of claim 8, wherein said first and second forward rectifiers and said first and second freewheeling rectifiers further comprise diodes.

11. The converter of claim 1, wherein said second switch includes first and second MOSFETs having a series connection and internal body diodes opposing each other.

12. The converter of claim 1, wherein said at least one secondary winding further comprises a first secondary winding and a second secondary winding, said first section further including said first secondary winding and said first inductor coupled between said first secondary winding and said first output, said second section including said second secondary winding and said second inductor coupled between said second secondary winding and said second output.

13. The converter of claim 12, wherein said first secondary winding has N1 turns, said second secondary winding has N2 turns, said first coupled inductor has NL1 turns, and said second coupled inductor has NL2 turns, such that a turns ratio N2/N1 is equal to a turns ratio NL2/NL1.

14. A method of regulating a converter comprising a transformer having a primary winding and at least one secondary winding, comprising the steps of:
   alternating between successive on-states and off-states of said converter wherein an input voltage is applied to said primary winding only during said on-states;
   rectifying a voltage on said at least one secondary winding to provide said first and second output voltages through respective first and second inductors; and
   applying a regulating voltage to one of said first and second inductors during a portion of said off-state of said conductor to thereby increase volt-seconds applied thereto.

15. The method of claim 14, wherein said applying step further comprises applying an auxiliary voltage as said regulating voltage to said one of said first and second inductors.

16. The method of claim 14, wherein said applying step further comprises applying said first output voltage as said regulating voltage to said one of said first and second inductors.

17. The method of claim 14, wherein said applying step further comprises applying said second output voltage as said regulating voltage to said one of said first and second inductors.

18. The method of claim 14, further including the step of inductively coupling said first and second inductors together.

19. The method of claim 14, wherein said at least one secondary winding further comprises a first secondary winding and a second secondary winding, and wherein said rectifying step further comprises rectifying a voltage on said first secondary winding to provide said first output voltages through said first inductor, and rectifying a voltage on said second secondary winding to provide said second output voltage through said second inductor.

20. The method of claim 19, further including the step of selecting a turns ratio of N2/N1 for said transformer wherein said first secondary winding has N1 turns, said second secondary winding has N2 turns, said first inductor has NL1 turns, and said second inductor has NL2 turns, wherein said ratio N2/N1 is equal to a ratio NL2/NL1.

* * * * *